United States Patent

[11] 3,612,555

[72] Inventor Calvin Lee Baker
Jefferson Court Apartment 3242 Winton Road South, Rochester, N.Y. 14623
[21] Appl. No. 851,183
[22] Filed Aug. 19, 1969
[45] Patented Oct. 12, 1971

[54] TRANSPORTABLE TANK TRAILER
7 Claims, 10 Drawing Figs.

[52] U.S. Cl. .................................................. 280/5 E,
9/6, 280/47.17, 280/414, 296/15, 298/6
[51] Int. Cl. .................................................. B60p 3/22
[50] Field of Search .......................................... 280/5, 5 C,
5 D, 5 E, 5 F, 47.17, 47.18, 82, 477, 511, 414, 63;
9/1, 2, 6; 296/15, 25; 288/6; 220/5

[56] References Cited
UNITED STATES PATENTS

| | | | |
|---|---|---|---|
| 598,599 | 2/1898 | Gooding | 280/5 X |
| 2,423,879 | 7/1947 | Frees | 280/5 C UX |
| D.155,902 | 11/1949 | Keating | 296/23 |
| 2,516,555 | 7/1950 | Dear | 280/511 |
| 2,816,672 | 12/1957 | Facchini | 280/414 X |
| 2,843,393 | 7/1958 | Dahlander, Sr. | 280/47.18 |
| 2,986,300 | 5/1961 | Parrish | 220/4 E |
| 3,133,294 | 5/1964 | Kunz | 9/6 |

FOREIGN PATENTS

| | | | |
|---|---|---|---|
| 1,246,868 | 10/1960 | France | 280/5 E |
| 1,330,830 | 5/1963 | France | 280/414 |

Primary Examiner—Benjamin Hersh
Assistant Examiner—John P. Silverstrim
Attorney—David H. Semmes ABSTRACT: A transportable trailer of the type having an elongated liquid-holding tank, a pair of wheels supported beneath the tank, and a ball socket assembly supported in the fore portion of tank for connection to a towing vehicle. The tank includes one or more filling apertures in the top for draining of mobile camper or trailer holding tanks and a master drain in its aft portion for release of the stored contents into a park dumping station. The tank is especially adapted for dumping travel trailers at campgrounds and, thus, has a relatively low profile so as to be wheeled beneath conventional trailers.

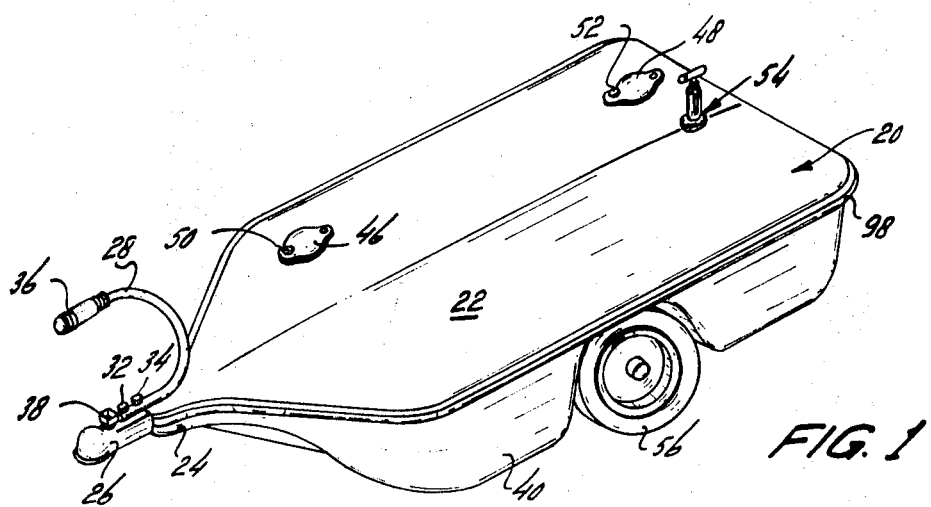
FIG. 1
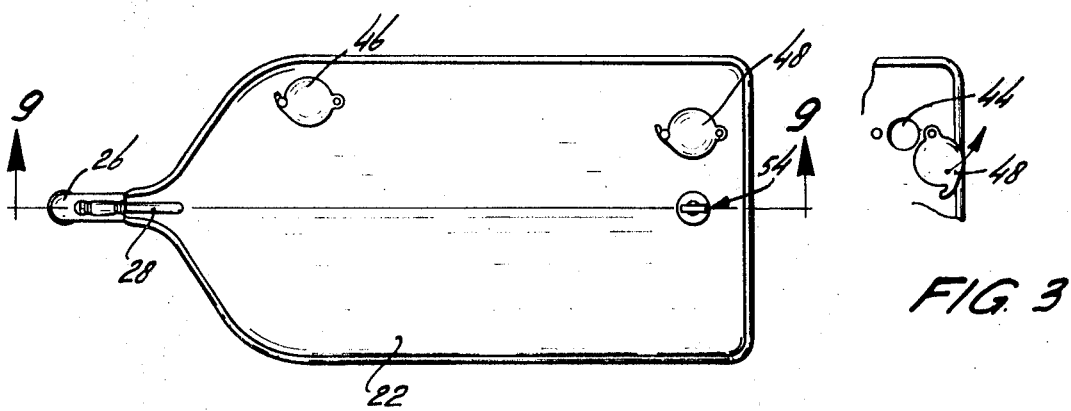
FIG. 2
FIG. 3
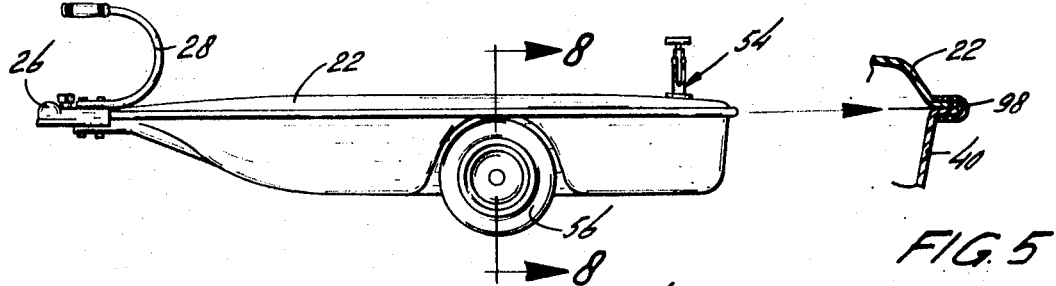
FIG. 4
FIG. 5
INVENTOR.
CALVIN LEE BAKER
BY David H. Semmes
ATTORNEY

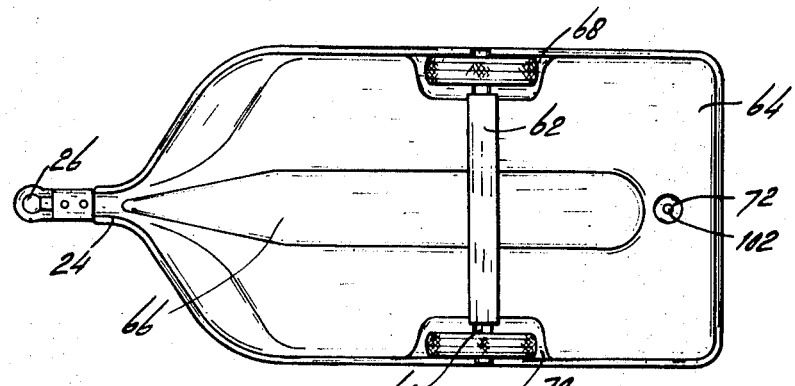
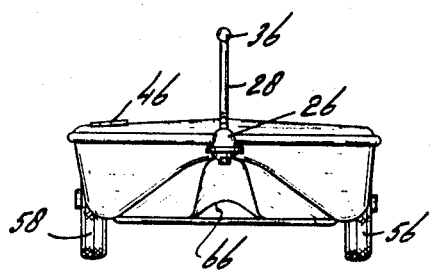
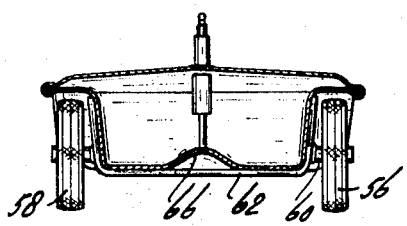
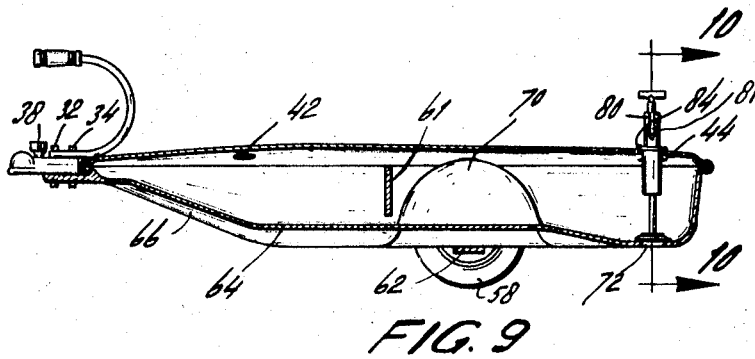
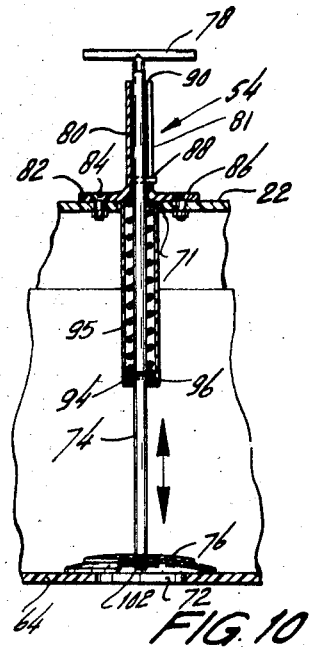

3,612,555

TRANSPORTABLE TANK TRAILER

CROSS-REFERENCES TO RELATED APPLICATIONS

None.

BACKGROUND OF THE INVENTION

1. Field of the Invention

A contemporary problem in campground and trailer camp sites is the sanitary removal of the liquid contents from the trailer holding tanks. Conventionally, this is done manually and ineffectively by means of a bucket and hose arrangement. There has been no attention given to the convenience or sanitation of the procedure.

2. Description of the Prior Art

Prior art searching has developed the following U.S. Pat. Nos.

| | |
|---|---|
| Bauders | 2,439,961 |
| Pflantz | 2,491,417 |
| McGrew | 2,765,193 |
| Fergason | 2,957,726 |
| Prichard | 3,019,002 |
| Simas | 3,193,150 |
| Smith | 3,304,122 |

Earlier inventors have devised wheeled storage tanks together with hoses which are used for input or output, for example, Bauders, Fergason, and Smith. Other inventors have used wheeled storage trailers with a tongue and a means for dumping the trailer. See Pflantz and McGrew. Simas supports a portable dumping bin upon a skid or palettelike base.

However, none of these inventors have adapted themselves to the particular problem of discharge from a mobile trailer holding tank and delivery of the tank contents to the park dumping station. Also, none of these prior inventors has solved the problem of devising a tank which was of sufficiently diminutive side elevation so as to be rollable beneath the mobile trailer being serviced. Also, none of the earlier trailers have been provided with filling vents or discharge apertures convenient to servicing the mobile trailers.

SUMMARY OF THE INVENTION

According to the present invention, a transportable trailer has been constructed with a holding tank having an aft portion, a relatively elongated midportion with filling apertures in its top and a drain in its bottom, and a fore portion converging into a tongue upon which a ball socket coupling is mounted. A pair of wheels is supported beneath the midportion, and a handle is secured to the tongue for manual turning and pulling of the trailer. The trailer is rolled beneath the mobile camper or trailer so that one of the filling apertures is in registry with the discharge hose from the trailer holding tank. The transportable trailer tank is filled, then removed to the trailer park dumping station where the contents are discharged by the discharge valve. The trailer may be pulled manually or by tractor or truck, servicing numerous mobile homes in a single run.

BRIEF DESCRIPTION OF THE DRAWINGS

FIG. 1 is a perspective view of the transportable trailer;

FIG. 2 is a top plan thereof;

FIG. 3 is a fragmentary top plan, showing the rear filling aperture opened;

FIG. 4 is a side elevation;

FIG. 5 is a fragmentary section of the transportable tank peripheral bead securing the top and sides together;

FIG. 6 is a bottom plan;

FIG. 7 is a front elevation;

FIG. 8 is a transverse section, taken along section line 8—8 of FIG. 4;

FIG. 9 is a longitudinal section taken along section line 9—9 of FIG. 2; and

FIG. 10 is a fragmentary vertical section of the drain valve assembly.

DESCRIPTION OF THE PREFERRED EMBODIMENTS

In FIG. 1, transportable trailer 20 is indicated as being comprised of an elongated tank, having a radiused top 22 and depending sides 40 converging into a tonguelike fore portion 24. A ball socket assembly 26 is secured to tongue fore portion 24 and includes tightening screw 38. A curvate handle 28, having a gripping piece 36 offset with respect to the tongue, may be secured thereon by means of stove bolts or the like 32, 34.

As illustrated in FIG. 5, the fiberglas, sheet metal, aluminum, or the like top 22 and sides 40 may be secured peripherally by press-fitting within bead element 98. Epoxy gluing, spot welding, or the like may be used, as well as press-fitting.

Top 22 includes individual filling ports 42 and 44, closed respectively by pivoted covers 46 and 48 which respectively engage locking studs 50 and 52.

Drain 54 in the aft portion includes aligned apertures 71 and 72 and an annular collar 80 secured to the top by means of setscrews or the like 84, 86, extending through base flange 82. Discharge valve shaft 74 extends through collar 80 and includes a bottom sealing element 76, secured by lock washer 102.

Shaft handle 78 extends above the collar top 90. As illustrated in FIG. 10, a lateral locking stud 88 extends through slot 81 in the collar 80, FIGS. 9 and 10 so as to lock the drain in closed position by a half turn rotation. Compression spring 94 in housing 95, surrounds shaft 74 and is fixed by key or the like 96 to a midportion of the shaft and is interposed therebetween and collar 80. The compression spring functions to urge the drain to closed position. Then, when the handle is raised and half-rotated, stud 88 rests upon the top 90 of the collar so as to lock the drain in open position.

The tank structure may be reinforced by one or more transverse baffles 60, which are secured intermediate the sides 40 and top 22 so as to be offset with respect to the bottom 64.

As illustrated in FIG. 8, a U-shaped midsupport piece 62 is secured to the tank within wheel wells 68 and 70, so that its horizontal portion extends as a support beneath the elongated tank. Wheels 68 and 70 are secured to identical axle elements 60 extending from these vertical portions. The trailer wheels are, thus, laterally inset within the peripheral bead 98, facilitating handling of the structure beneath a mobile trailer bottom.

As illustrated in FIG. 6, bottom 64 includes an elongated axial concavity 66 extending from drain aperture 72 towards the tongue 24, as a reinforcement measure.

As will be apparent, the tank portion may be manufactured in different sizes from 20 gallons to 300 gallons and in different shapes from steel, plastic, fiberglas, or aluminum. The tires may vary in size depending on the size of any one tank. Also, various shutoff valves, fitting for hookup and variation of the inlets may be employed without departing from the spirit of the invention.

In one configuration, a 42 gallon tank had dimensions as follows:

Length—72 inches

Width—33 inches

Depth—9 inches

Overall height—13 inches wheels—12 inches diameter (3 inch width)

Ball coupler—2 inches

I claim:

1. A transportable trailer comprising:

A. a holding tank having a transomlike aft portion, a relatively elongated midportion with fore and aft filling apertures and a drain, and a fore portion converging into a tongue, said tank including:

i. a radiused top, such that an axial portion is positioned above the sides;

ii. a peripheral bead enclosing the joinder of top and sides; and iii. an axial concavity extending from the said drain to said tongue.

B. a paid or wheels supported beneath said midportion and extending on either side thereof;

C. a ball socket coupling connected to said tongue for engagement with a towing vehicle; and D. a handle secured on the top of said tongue and offset with respect thereto.

2. A transportable trailer as in claim 1, said elongated midportion including concave wheel wells on either side, so that each of said wheels is inset laterally of said peripheral bead and said portion in side elevation extending inclinedly upward from the tank bottom to the ball socket connection to said tongue.

3. A transportable trailer as in claim 2, said holding tank having at least one transverse baffle supported between the sides thereof so as to engage said top and so as to be offset with respect to the bottom of the tank.

4. A transportable trailer as in claim 3, including a U-shaped midsupport piece secured at its vertical sides to the inner sides of said wheel wells and said support piece at its midportion abutting the tank bottom exterior as a support for said tank and said support piece vertical sides including axle members extending laterally thereof to support said wheels.

5. A transportable trailer as claimed in claim 4, said drain being positioned adjacent said transomlike aft portion and including:

i. aligned apertures in the top of said tank and in the bottom of said tank;

ii. an annular collar supported above said top aperture; and iii. a discharge valve shaft reciprocably supported in said collar and extending downwardly through said collar toward said bottom aperture, said shaft having a sealing member on its bottom end engageable with the periphery of said bottom aperture.

6. A transportable trailer as in claim 5, said shaft including a locking stud lockable with the collar midportion so as to lock said drain closed and lockable with the collar top so as to lock to drain open.

7. A transportable trailer as in claim 6, said drain including a compression spring member interposed between a midportion of said shaft and said collar, so as to urge said drain to closed position.